US006457754B1

(12) United States Patent
Bystry et al.

(10) Patent No.: US 6,457,754 B1
(45) Date of Patent: Oct. 1, 2002

(54) CABLE LOCK WITH SECURITY INSERT

(75) Inventors: Jerry A. Bystry, Orland; Eric K. Hamilton, Fort Wayne, both of IN (US)

(73) Assignee: Brammall, Inc., Angola, IN (US)

(*) Notice: Subject to any disclaimer, the term of this patent is extended or adjusted under 35 U.S.C. 154(b) by 0 days.

(21) Appl. No.: 09/524,142

(22) Filed: Mar. 10, 2000

Related U.S. Application Data

(63) Continuation-in-part of application No. PCT/US99/15616, filed on Jul. 9, 1999.
(60) Provisional application No. 60/092,392, filed on Jul. 10, 1998.

(51) Int. Cl.[7] ................................................. G09F 3/03
(52) U.S. Cl. ................................. 292/307 R; 292/323
(58) Field of Search ............................ 292/307 R, 308, 292/309, 311, 312, 313, 318, 319, 320, 321, 323

(56) References Cited

U.S. PATENT DOCUMENTS

| 1,950,893 A | 3/1934 | Kemper et al. |
| 3,770,307 A | 11/1973 | Van Gompel |
| 4,049,303 A | 9/1977 | Irwin et al. |
| 4,074,916 A | 2/1978 | Schindler |
| 4,157,653 A | 6/1979 | Dohanyos |
| 4,628,715 A | 12/1986 | Uyeda et al. |
| 4,640,538 A | 2/1987 | Brammall |
| 4,747,631 A | 5/1988 | Loynes et al. |
| 4,981,314 A | 1/1991 | Carr |
| 5,092,641 A | 3/1992 | Penick, Jr. |
| 5,352,003 A | 10/1994 | Bystry |
| 5,417,400 A | 5/1995 | Arakawa |
| 5,538,300 A | 7/1996 | Brown |
| 5,582,447 A | 12/1996 | Leon et al. |
| 5,611,583 A | 3/1997 | Bystry et al. |
| 5,647,620 A | 7/1997 | Kuenzel |
| 5,884,949 A | * 3/1999 | Leon et al. .................. 292/318 |
| 6,155,617 A | * 12/2000 | Kuenzel ..................... 292/318 |

FOREIGN PATENT DOCUMENTS

| GB | 1490721 | 11/1997 | ........... E05B/15/16 |
| WO | WO 84/01847 | 5/1984 | ............. G09F/3/03 |

OTHER PUBLICATIONS

PCT International Search REeport for PCT application PCT/US99/15616, to which this application claims priority.
Eurasian Patent Office International Search Report (in Russian language) dated Apr. 3, 2001.

* cited by examiner

*Primary Examiner*—Stephen Avila
(74) *Attorney, Agent, or Firm*—Van Dyke, Gardner, Linn & Burkhart, LLP

(57) ABSTRACT

A cable lock includes a security insert to help prevent tampering with the internal components of the cable lock. The security insert may include a pair of side panels oriented generally parallel to each other and an end panel oriented generally perpendicular to the side panels. The security insert fits between an inner and outer member which are both made of relatively soft metal, such as aluminum or zinc casting. The security insert is made of a harder material, such as steel, which is resistant to drilling. The security insert surrounds a locking mechanism that may include a disc positioned on an angled incline.

19 Claims, 4 Drawing Sheets

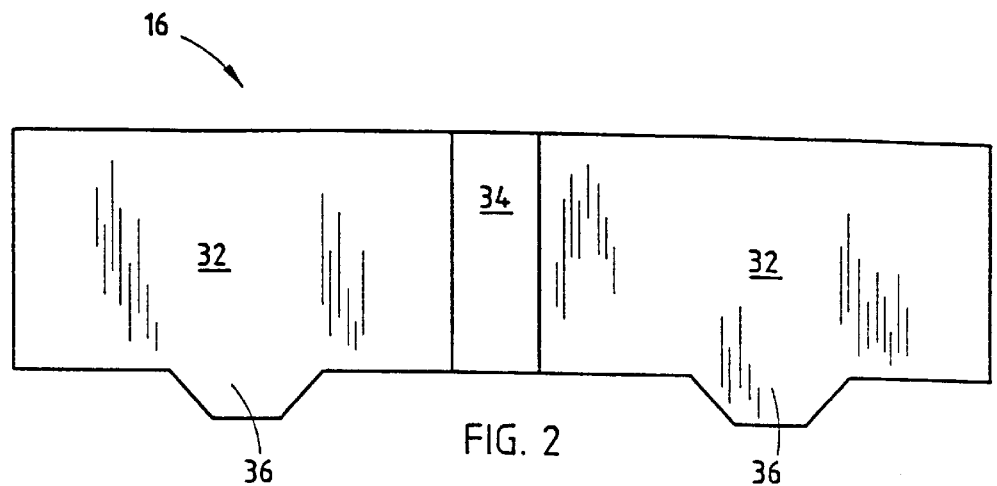
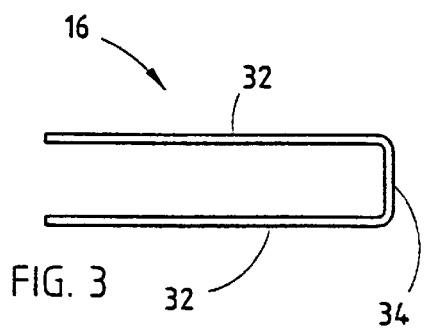
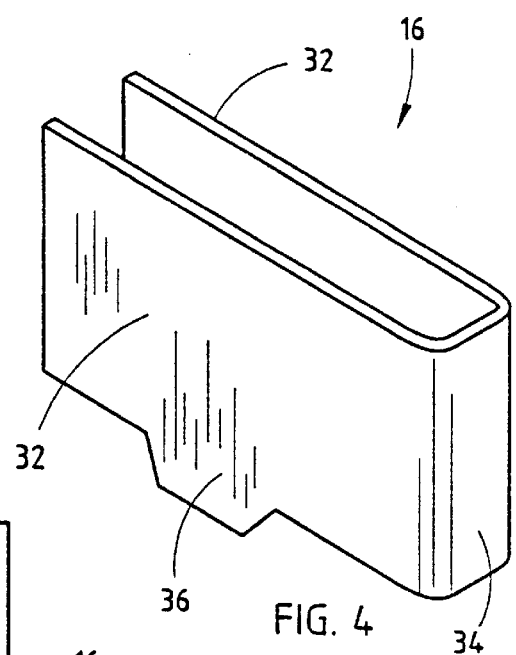
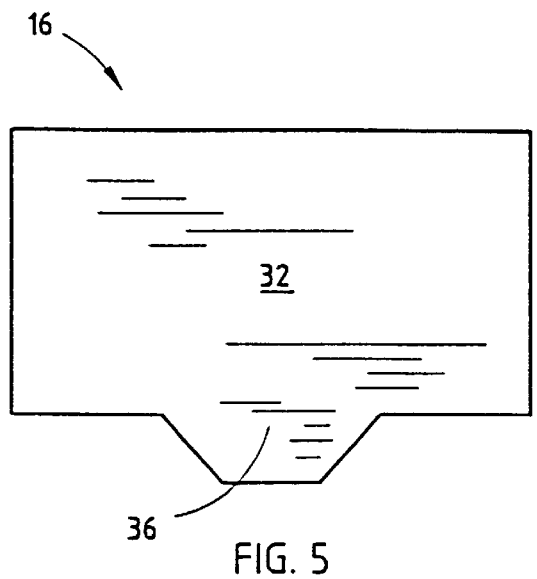
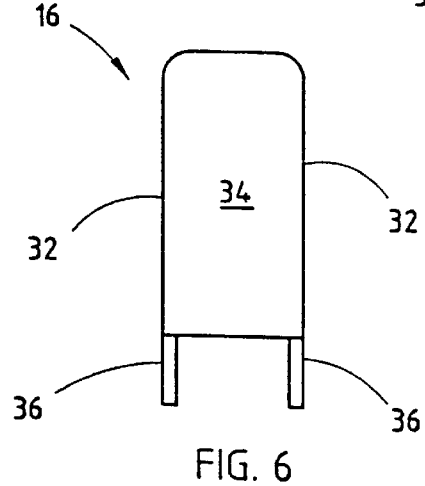

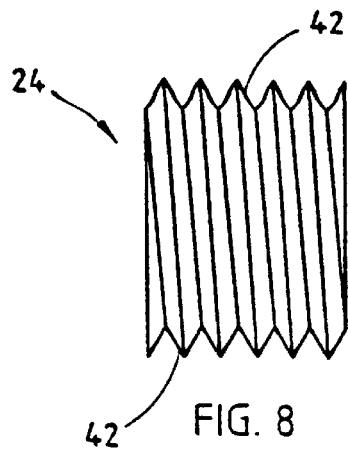
FIG. 7
FIG. 8
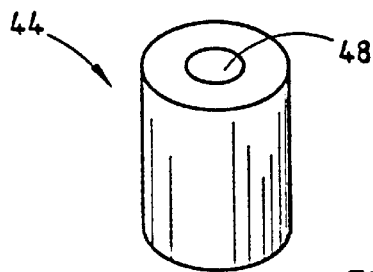
FIG. 9
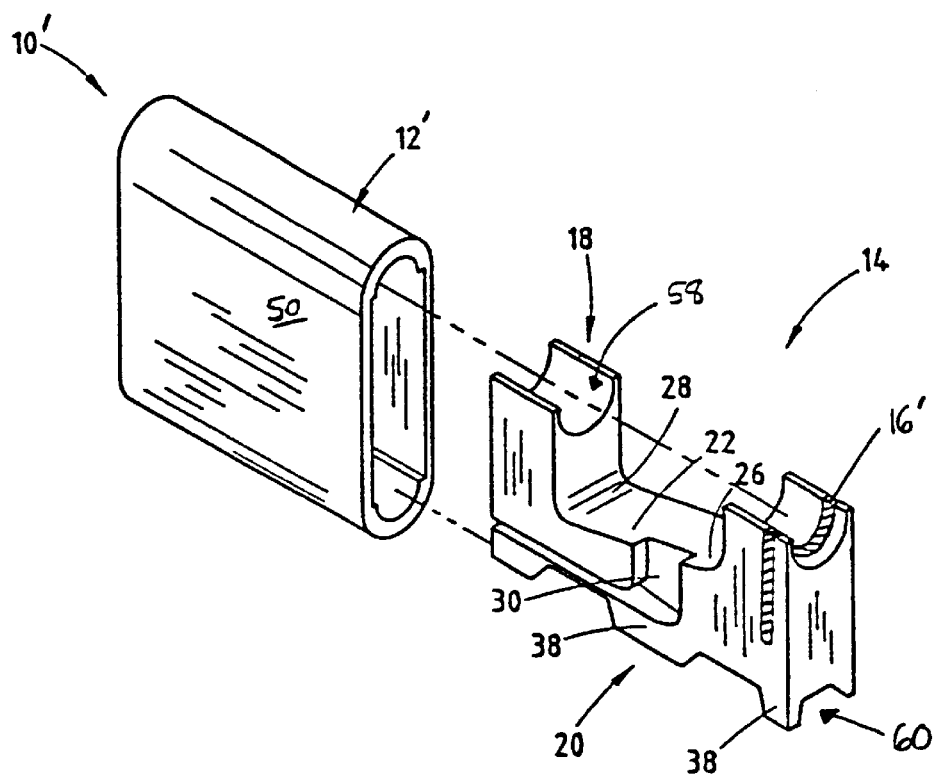
FIG. 10

CABLE LOCK WITH SECURITY INSERT

This application claims priority to and is a continuation-in-part application of International Application Number PCT/US99/15616, filed Jul. 9, 1999, entitled Cable Lock With Security Insert, and U.S. Provisional Application Serial No. 60/092,392, filed Jul. 10, 1998.

BACKGROUND OF THE INVENTION

This invention relates generally to locking devices, and in particular to a method and device for the prevention of tampering with cable locking devices.

An example of a prior art cable lock 100 is depicted in FIG. 12. The cable lock includes an outer member 101 surrounding an inner member 102. A pair of channels 104a and b are defined between inner and outer members 102 and 101, and a cable 106 is inserted into channels 104a and b. Cable 106 is locked in place in channel 104a by a disk 108 positioned on a ramp 110 defined on inner member 102. Prior to insertion of cable 106 into channel 104a, disk 108 is biased toward a top end 112 of ramp 110 by a spring 114. The insertion of cable 106 forces disk 108 down ramp 110. If cable 106 is then retracted in a direction 118 shown in FIG. 12, disk 108 squeezes cable 106 and prevents its removal. A more detailed disclosure of the prior art depicted in FIG. 12 can be obtained in U.S. Pat. No. 5,611,583.

It has been discovered that prior art cable locks, such as cable lock 100 discussed above, suffer from several disadvantages. One of these disadvantages is the ease in which the presence of these security locks can be identified. These cable locks are often used to secure the contents of rail cars, semi-trucks, or other like vehicles. During the night-time hours, it can be a difficult and time-consuming job to check for the presence of these security locks on a vehicle, especially when there are numerous vehicles, as in the case of a train comprising a large number of rail cars. In the past, a person checking for the presence of these security devices has had to provide his or her own light source, such as a flashlight, and aim the light precisely at the lock in order to identify whether a security lock is present or not. This task can prove to be undesirably time consuming.

Another disadvantage of past cable locks are their susceptibility to being tampered with by determined thieves. The tampering occurs in one of two general ways. First, a hole may be drilled generally through a wall 116 located at an end of cable lock 100 (FIG. 12). The hole is drilled oriented toward disk 108. After completely drilling through wall 116, a pin or other suitable instrument is inserted into the drilled hole and used to push disk 108 down the ramp 110, overcoming the biasing force of spring 114. With disk 108 pushed down ramp 110, cable 106 can be retracted from channel 104a by pulling in the direction indicated by arrow 118. The drilled hole is then filled with a metal putty or filler corresponding to the material of the lock, which makes detection of the tampering virtually impossible. A second type of tampering can occur by drilling a hole into one of the sides of cable lock in an area 120 adjacent disk 108. The hole is drilled through outer member 101. A pin or other instrument is again used to push disk 108 down ramp 110 and thereby allow cable 106 to be retracted. A metal filler or putty is used to conceal the hole.

The aforementioned two methods of tampering with cable locks allow thieves to gain access to the contents of whatever the cable lock is protecting with minimal chance of detecting at what point, in the chain of movement of the goods, the theft occurs. This reduces the chances of identifying the thieves or recovering the goods. If a cargo is being shipped a great distance and passes through multiple warehouses, it may be impossible to tell in which of the multiple warehouses the theft or other tampering occurred. It can therefore be seen that a cable lock overcoming these and other disadvantages is very desirable.

SUMMARY OF THE INVENTION

According to one aspect of the present invention, a security lock is provided having an inner member and an outer member surrounding the inner member. The inner member defines a ramp on which a disk is positioned for movement along the ramp. A security insert having increased hardness, when compared to the outer member, is inserted between the outer and inner members. The security insert includes a pair of side panels dimensioned to surround the area adjacent the ramp on which the disk moves. The security insert further includes an end panel oriented generally perpendicular to the side panels and dimensioned to cover a portion of the inner member adjacent the upper end of the ramp.

According to another aspect of the present invention, a security lock is provided having an inner member that includes a first and a second end wall. The inner member defines an inclined ramp disposed between the first and the second wall. The ramp extends upwardly from the first end wall to the second end wall. A disk is positioned on the inclined ramp and biased up the ramp by one end of a spring. The other end of the spring is secured to the inner member. An outer shell fits over the inner member. the disk, and the spring. The outer shell and the inner member define a first and a second channel when the outer shell is placed over the inner member. A drill resistant member is disposed in the second end wall. The drill resistant member is made up of a material that is more resistive to drilling than the inner member.

According to another aspect of the present invention. a security lock is provided that comprises a body which defines at least one channel. A flexible member, such as a wire, cable, or the like, is attached at one end to the body and has another free end. A locking structure is defined in the body that allows the free end of the flexible member to be inserted into the channel in a first direction, but prevents extraction of the flexible member out of the channel in a reverse direction. A photo-luminescent coating is defined on or in the body which absorbs light energy while in the presence of ambient light and emits light energy while in the presence of ambient darkness.

The improved cable lock of the present invention substantially overcomes the disadvantages discussed above. The photo-luminescent coating provides for an easy indication of the presence of the security device without the need for a separate source of light. The improved security lock also overcomes both of the tampering techniques discussed previously. The security insert is preferably manufactured from hardened or heat-treated steel, or other material suitably resistant to drilling. The security insert may simply be a flat plate inserted into the inner member adjacent the upper end of the ramp, or the security insert may comprise a three-walled member. When the security insert includes three walls, the side panels substantially prevent drilling through the sides of the lock to access and move the disk, while the end panel substantially prevents drilling through the end wall of the cable lock. By manufacturing the security insert from a suitably hard material. the material of the inner and outer member need not be changed, thus providing a cost-efficient tamper resistant cable lock. In another aspect of the invention, as applied to a cable lock device, a cylinder is swaged on the protruding end of the permanently secured cable end to prevent axial tampering of the cable to defeat the clamping of the permanent end. These and other benefits, results, and objects of the present invention will be apparent to one skilled in the art in light of the following specification, when read in conjunction with the accompanying drawings.

BRIEF DESCRIPTION OF THE DRAWINGS

FIG. 2 is a plan view of a piece of metal that is bent into a security insert;

FIG. 3 is a plan view of the security insert of the present invention in its final, bent shape;

FIG. 4 is a perspective view of the security insert;

FIG. 5 is a side, elevational view of the security insert;

FIG. 6 is an end, elevational view of the security insert;

FIG. 7 is a side, elevational view of the disk according to one aspect of the present invention;

FIG. 8 is a front, elevational view of the disk;

FIG. 9 is a perspective view of a cable cylinder according to the present invention;

FIG. 10 is an exploded, perspective view of several components of another embodiment of a cable lock according to the present invention;

BRIEF DESCRIPTION OF THE PREFERRED EMBODIMENTS

Figure 1:
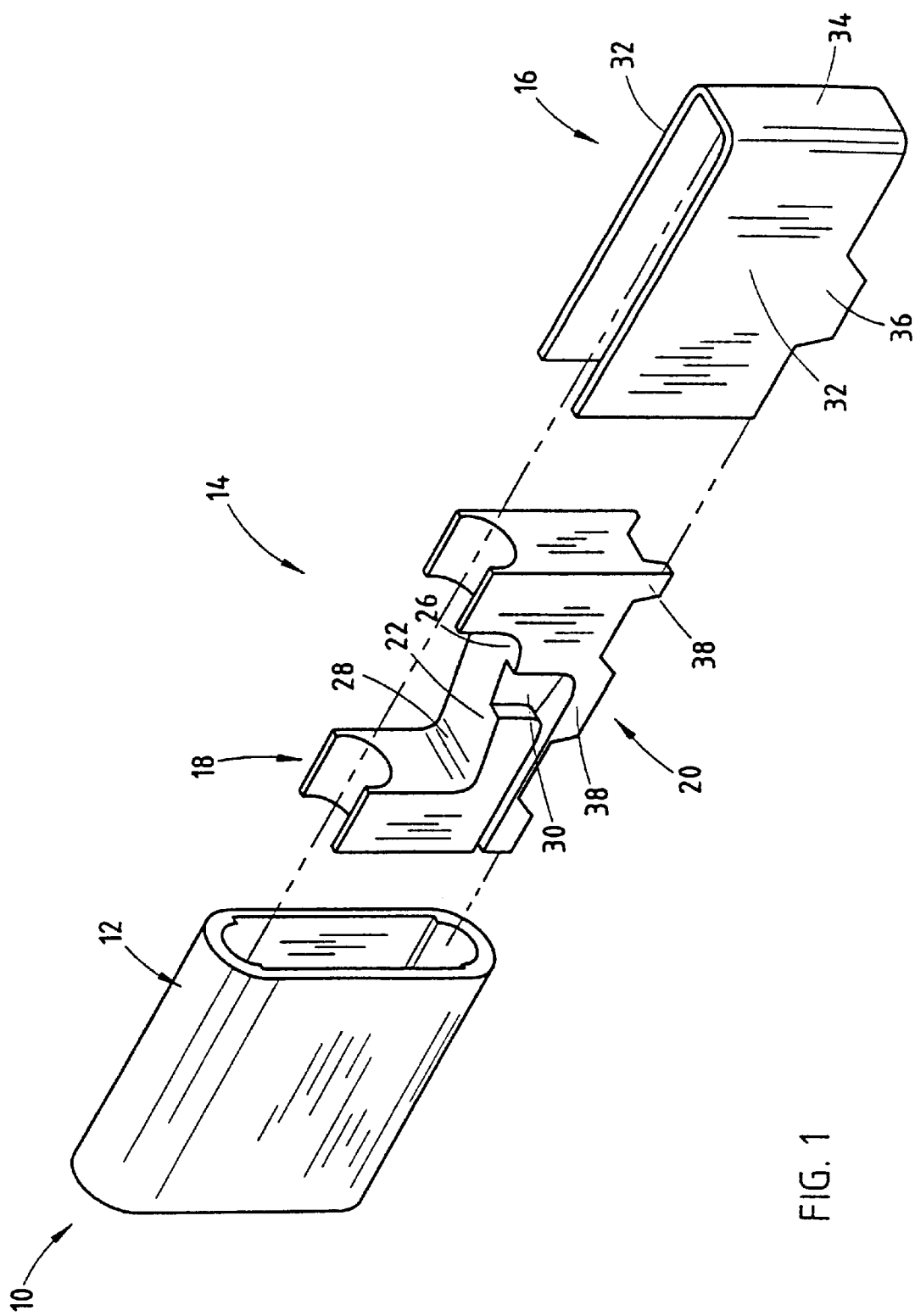
FIG. 1 is an exploded, perspective view of a cable lock according to one embodiment of the present invention.

The present invention will now described with reference to the accompanying drawings wherein like reference numerals correspond to like elements in the several drawings. A partial exploded assembly of components comprising a cable or security lock 10 according to the present invention is depicted in FIG. 1. Cable lock 10 includes an outer member or shell 12 which surrounds an inner member 14 and a security insert 16. Inner member 14 and security insert 16 are dimensioned to fit inside the interior of outer member 12. Inner member 14 includes a top 18 and bottom 20. Top 18 and bottom 20 are shaped to define channels first and second channels 58 and 60 between inner member 14 and outer member 12 when inner member 14 is inserted into outer member 12 (FIG. 10). The channels are designed to allow a cable 13 to be inserted therein. Inner member 14 further defines a ramp 22 on which a disk 24 (FIG. 11) is positioned. Ramp 22 includes an upper end 26 and lower end 28. Disk 24 is biased toward upper end 26 by a spring 56 (FIG. 11) inserted into a spring cavity 30 defined in inner member 14. When a cable is inserted into a channel defined by outer member 12 and top 18 of inner member 14, the cable pushes disk 24 down ramp 22 towards lower end 28. Any attempt to retract the cable from the channel in the opposite direction results in movement of disk 24 of ramp 22 where it tightly grips the cable and prevents its removal. The operation and interaction of inner member 14, outer member 12, and dish 24 with a cable are more fully described in commonly assigned U.S. Pat. No. 5,611,583 which is incorporated herein by reference.

Security insert 16, according to one embodiment, surrounds at least three sides of inner member 14 (FIGS. 1–6). Security insert 16 is a drill resistant member which is made of a material that is harder to drill through than either outer shell 12 or inner member 14. Security insert 16 includes a pair of side walls that are generally parallel to each other. Side walls 32 are connected to each other by an end wall 34 that is substantial perpendicular to side walls 32. Side walls 32 each include one or more downwardly depending flanges 36. Flanges 36 correspond to, and align with, one or more downward projections 38 located on bottom 20 of inner member 14. Downward projections 38 are adapted to securely grip a cable inserted in the channel defined between outer member 12 and bottom 20 of inner member 14. In addition to securing a cable in the lower channel, flanges 36 help retain security insert 16 in cable lock 10.

Inner member 14 is a zinc casting, and outer member 12 is currently made of aluminum. Security insert 16 is preferably made from steel. While it will be understood that security insert 16 can be made from other materials besides steel, it has been found that a material such as SAE 1095 annealed steel having a Rockwell "C" hardness of 47–50 has been found to be suitable in the current embodiment. Such a material provides a sufficient drill resistance to deter thieves. It will be understood, of course, that it is impossible to provide a security insert 16 manufactured from material that is absolutely impenetrable. The goal, however. is to provide a locking device that is sufficiently tamper resistant to require more tools and effort than a typical thief would normally be willing and able to procure and invest in tampering with the cable lock.

Disk 24 is pictured in FIGS. 7 and 8. Disk 24 includes a pair of side surfaces 40 and a peripheral surface 42. Peripheral surface 42 is preferably threaded to provide better gripping of the cable. While peripheral surface 42 can be threaded in a variety of shapes and configurations, peripheral surface 42 in the current embodiment has twenty four threads per inch.

In order to further protect against tampering, cable lock 10 according to one aspect of the present invention may include a cylinder 44 (FIG. 9) that is swaged onto the cable. Cylinder 44 is preferably swaged onto a section 46 of the cable as referenced in FIG. 11. The swaging of cylinder 44 onto the cable provides increased resistance to pulling the cable out of a channel, such as channel 60 in FIG. 11. Cylinder 44 helps prevent pullout in the direction indicated by arrow 122 in FIG. 11. Cylinder 44 includes a central bore 48 in which the cable resides after cylinder 44 has been swaged thereon. In the current embodiment, central bore 48 has a diameter of 0.20 inches prior to swaging. After swaging, the external diameter is compressed to approximately 0.375 inches. In the current embodiment it has been found that cable lock 10 equipped with cylinder 44 resists pullout of the cable up to approximately 1.9 tons of force. Cylinder 4 is made of aluminum in the current embodiment. It will be understood, of course, that other shapes, sizes, and materials can be used for cylinder 44.

Figure 11:
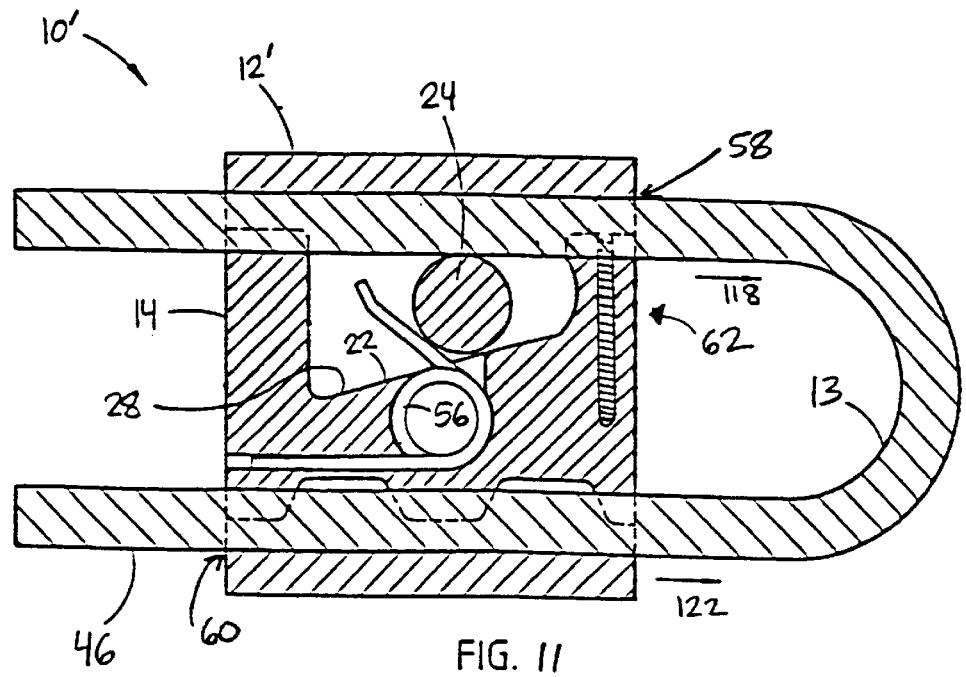
FIG. 11 is a sectional, elevational view of the cable lock of FIG. 10.
Figure 12:
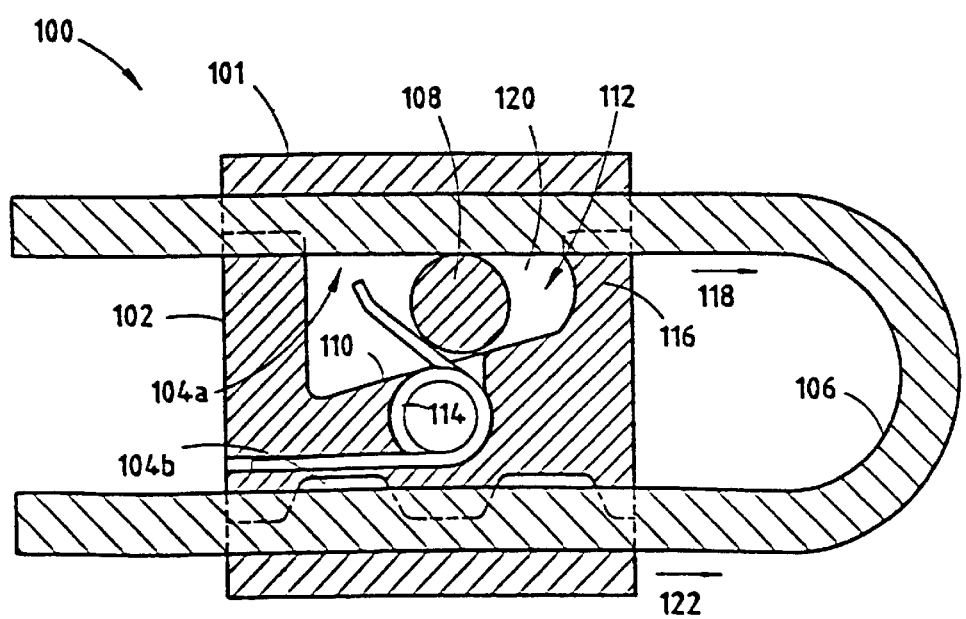
FIG. 12 is a sectional, elevational view of a prior art cable lock.

According to another aspect of the invention, a security or cable lock 10' is depicted in FIGS. 10 and 11. Components of security lock 10' corresponding to lock 10 are referenced using the same numerals as security lock 10, where the prime symbol denotes a change from the embodiment of security lock 10. Security lock 16' includes an outer shell 12' which has a smaller interior than shell 12. The interior of outer shell 12' is smaller than the interior of outer shell 12 due to the fact that the security insert 16' of lock 10' is located in a different position than security insert 16, and outer shell 16' therefore does not have to accommodate for the same space. Lock 10' includes a first and second end wall 52 and 54, respectively, which surround ramp 22. Security insert 16' is a drill resistant member that is located in second end wall 52. Insert 16' extends from first channel 58 into inner member 14 for a depth at least as deep as lower end 28 of ramp 22. Security insert 16' provides security against drilling into inner member 14 from a position 62 located generally adjacent security insert 16' (FIG. 11). Security insert 16' may be oriented vertically with inner member 14, but is preferably oriented at an angle within inner member 14. The angled orientation of security insert 16' provides increased resistance to drilling due to the fact that a drill bit acting against insert 16' would not be able to attack insert 16' at a perfectly perpendicular angle, which is the most effective angle for drilling. In the preferred embodiment, insert 16' is made of hardened steel, although other metals can, of course, be used. Insert 16' can be made of any metal which has a resistance to drilling which is greater than that of the material of inner member 14. As illustrated in Fit. 10, insert 16' has a width which is equal to that of inner member 14 to thereby provide as complete of a shield as possible from drill attacks originating in area 62.

In either lock 10 or 10', outer shell 12 can be coated with a photo-luminescent coating that absorbs light energy when in the presence of ambient light and emits light energy when in the presence of ambient darkness. The coating 50 (FIG. 10) can be placed around the entire exterior surface of outer shell 12. or it can be isolated along selected areas of outer shell 12. The photo-luminescent coating provides a visual indicator of the presence of the light during poor or absent lighting conditions. Alternatively, if outer shell 12 is manufactured from plastic or other like material, the photo-luminescence can be created by mixing a photo-luminescent powder into the plastic during manufacture. This provides a photo-luminescent exterior that is ingrained within the material of outer shell 12. This has the advantage of being resistant to wear. Such a photo-luminescent powder can be used within the outer structure of security locks, such as those disclosed in commonly assigned, copending application Ser. No 09/399,530, filed Sep. 20, 1999, entitled Self-Locking Wire Seal, the disclosure of which is hereby incorporated herein by reference. Additionally, a photo-luminescent coating can be applied to the exterior of such locks as are disclosed in this reference.

While the present invention has been described in terms of the preferred embodiments depicted in the drawings and discussed in the above specification, it will be understood by one skilled in the art that the present invention is not limited to these particular preferred embodiments, but includes any and all such modifications that are within the spirit and scope of the present invention as defined in the appended claim. As but one example, it will be understood that the present invention is equally applicable to locks utilizing clasps instead of cables. Other variations are, of course, possible.

The embodiments of the present invention in which an exclusive property or privilege is claimed are defined as follows:

1. A cable lock comprising:
   an inner member defining a ramp for a disk;
   an outer member surrounding said inner member; and
   a security insert including a pair of side panels oriented generally parallel to each other and dimensioned to surround the disk on said ramp, and an end panel oriented generally perpendicular to said pair of side panels, said end panel dimensioned to cover a portion of said inner member adjacent an upper end of said ramp, said security insert positioned at least partially between said inner member and said outer member.

2. The security insert of claim 1 further including a downwardly depending flange attached to each of said side panels, said flange adapted to contact a cable inserted through a channel defined in said cable lock.

3. The security insert of claim 1 wherein said side panels and said end panel are each made from steel.

4. The security insert of claim 1 wherein said side panels and said end panel are integrally connected.

5. The security insert of claim 1 wherein said disk has an externally threaded surface.

6. The security insert of claim 1 further including a cylinder swaged onto the cable adjacent said inner member in a location that prevents removal of the cable from the cable lock.

7. In a cable locking device having an inner member, a disk positioned on a ramp defined by said inner member, and an outer member surrounding said inner member on at least two sides of said inner member, a method for preventing tampering with the cable locking device, comprising:
   positioning a plate on each side of said inner member between said inner member and said outer member adjacent said disk; and
   providing a flange at a bottom of each of said plates, said flange adapted to contact a cable inserted through said channel.

8. A cable lock comprising:
   an inner member having a first and a second end wall, said inner member defining an inclined ramp between said first and second end walls, said inclined ramp extending upwardly from said first end wall toward said second end wall;
   a disk positioned on said inclined ramp;
   a spring having a first and a second end, said first end of said spring secured to said inner member, said second end of said spring in engagement with said disk such that said spring exerts a biasing force against said disk up said inclined ramp;
   an outer shell which is dimensioned to fit over said inner member, said disk, and said spring, said outer shell and said inner member defining a first and a second channel when said outer shell is placed over said inner member, said first and said second channels dimensioned to receive a cable; and
   a drill resistant member disposed in said second end wall, said drill resistant member being made of a material which is more resistant to drilling than said inner member.

9. The cable lock of claim 8 further including a photo-luminescent coating applied to an outer surface of said outer shell.

10. The cable lock of claim 8 wherein said inner member is made of zinc and said drill resistant member is made of hardened steel.

11. The cable lock of claim 8 wherein said drill resistant member is oriented at an angle within said inner member.

12. The cable lock of claim 8 wherein said drill resistant member extends into said inner member for a depth at least equal to the depth of said ramp defined in said inner member.

13. The cable lock of claim 8 wherein said drill resistant member has a width equal to the width of said inner member.

14. The cable lock of claim 13 wherein said drill resistant member is inserted into said inner member from said second channel.

15. A lock, comprising:
   a body defining at least one channel, said body including an inner member and an outer shell;

a flexible member having a free end and an end fixed to said body;

a locking structure defined in said body, said locking structure including a disk positioned on a ramp defined in said inner member and a spring adapted to bias said disk up said ramp and at least partially into said channel, said locking structure adapted to allow said free end of said flexible member to be inserted into said channel past said lock in a first direction, but prevent said flexible member from being moved in an opposite direction out of said channel, said outer shell of said body dimensioned to fit over said locking structure and said inner member;

a photo-luminescent material defined on an exterior surface of said outer shell, said photo-luminescent coating adapted to absorb light energy when in the presence of ambient light and to emit light when in the presence of ambient darkness; and a drill resistant member positioned between said outer shell and said inner member, said drill resistant member including at least three sides which surround said ramp and disk.

16. A lock, comprising:

a body defining at least one channel, said body including an inner member and an outer shell;

a flexible member having a free end and an end fixed to said body;

a locking structure defined in said body, said locking structure including a disk positioned on a ramp defined in said inner member and a spring adapted to bias said disk up said ramp and at least partially into said channel, said ramp being defined in said inner member between a first and second wall, said first wall positioned adjacent a lower end of said ramp and said second wall positioned adjacent an upper end of said ramp, said locking structure adapted to allow said free end of said flexible member to be inserted into said channel past said lock in a first direction, but prevent said flexible member from being moved in an opposite direction out of said channel, said outer shell of said body dimensioned to fit outer said locking structure and said inner member;

a photo-luminescent material defined on an exterior surface of said outer shell, said photo-luminescent coating adapted to absorb light energy when in the presence of ambient light and to emit light when in the presence of ambient darkness; and a drill resistant member disposed in said second wall, said drill resistant member being made of a material which is more resistant to drilling than the material of said inner member.

17. The cable lock of claim 16 wherein said drill resistant member is oriented at an angle within said inner member.

18. The cable lock of claim 17 wherein said drill resistant member extends into said inner member for a depth at least equal to the depth of said ramp defined in said inner member.

19. The cable lock of claim 18 wherein said drill resistant member has a width equal to the width of said inner member.

* * * * *